Figure 1:
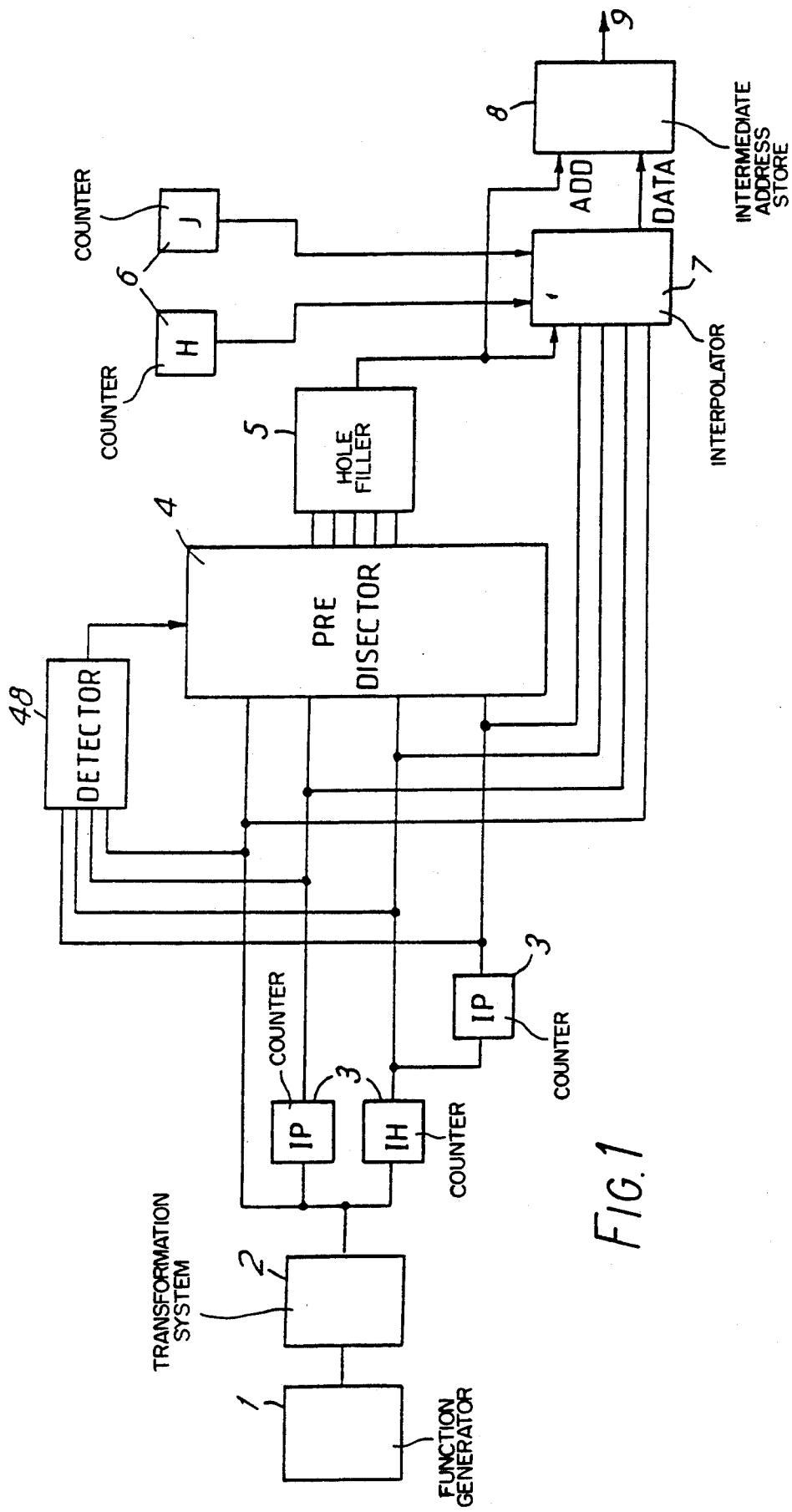

United States Patent [19]

Billing et al.

[11] Patent Number: 5,293,233
[45] Date of Patent: Mar. 8, 1994

[54] DIGITAL VIDEO EFFECTS WITH IMAGE MAPPING ON TO CURVED SURFACE

[75] Inventors: Robert Billing, Crowthorne; Nicholas Barton, Wokingham, both of United Kingdom

[73] Assignee: Questech Limited, Wokingham, United Kingdom

[21] Appl. No.: 890,597

[22] PCT Filed: Jan. 10, 1991

[86] PCT No.: PCT/GB91/00033

§ 371 Date: Jul. 10, 1992

§ 102(e) Date: Jul. 10, 1992

[87] PCT Pub. No.: WO91/10966

PCT Pub. Date: Jul. 25, 1991

[30] Foreign Application Priority Data

Jan. 21, 1990 [GB] United Kingdom ............... 9000674

[51] Int. Cl.$^5$ ................... G06F 15/72; H04N 5/262
[52] U.S. Cl. ......................... 348/581; 395/125
[58] Field of Search ............... 395/125, 119; 358/160, 358/182, 183; H04N 5/262

[56] References Cited

U.S. PATENT DOCUMENTS 4,751,579 6/1988 Okunishi et al. ............... 358/183
4,809,070 2/1989 Lake, Jr. ............... 358/166
4,965,844 10/1990 Oka et al. ............... 382/44

FOREIGN PATENT DOCUMENTS

WO90/03703 4/1990 PCT Int'l Appl. ......... H04N 5/262
2215552 9/1989 United Kingdom ........ H04N 5/262

Primary Examiner—Mark R. Powell
Attorney, Agent, or Firm—Jacobson, Price, Holman & Stern

[57] ABSTRACT

In a digital video effects system having a store (8) wherein coordinate values are stored in curved order by addressing the store with coordinate values transformed by a function generator (1) and transformer (2) and storing linear values derived from counters (6), the resolution of incremental values from the transformer (2) is increased as necessary to avoid unwritten addresses in the store by providing, between the transformer (2) and the store (8), delay means (3) for providing coordinates of the corners of adjacent quadrilateral areas defined by integer values of the transformed coordinates, a "predisector" (4) for providing coordinates of smaller quadrilateral areas into which the first areas can be divided, and a "hole filler" (5) for generating intermediate coordinate values falling within each smaller quadrilateral. An interpolator (7) serves to provide intermediate data values derived from the linear values to match the intermediate coordinate values generated by the hole filler.

17 Claims, 10 Drawing Sheets

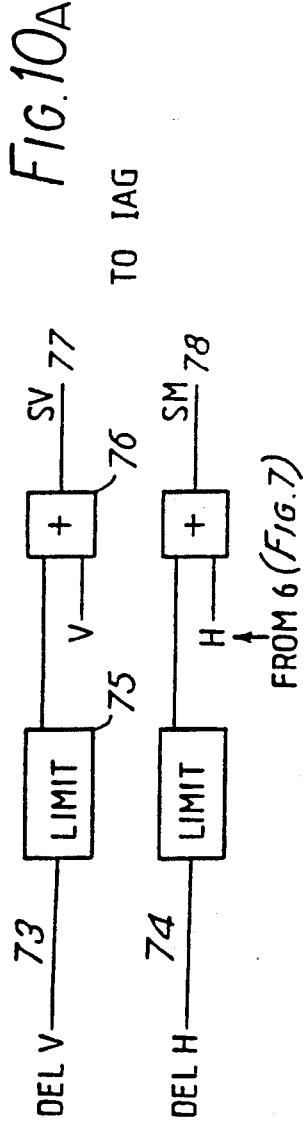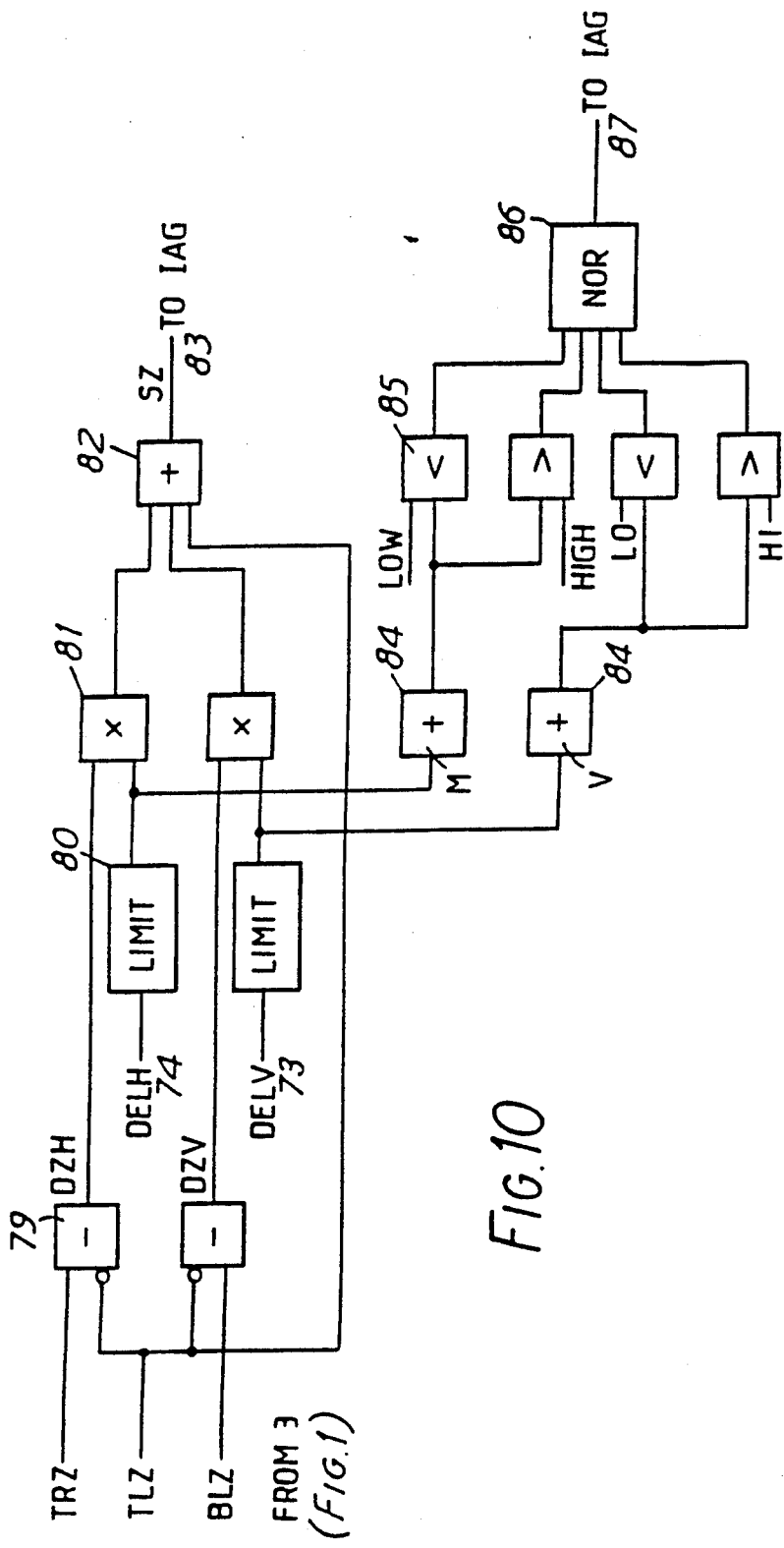

DIGITAL VIDEO EFFECTS WITH IMAGE MAPPING ON TO CURVED SURFACE

This invention relates to an apparatus for use with a digital video effects system, and, more especially, concerns improvements relating to apparatus of the kind described in International Application PCT/GB89/01116, the disclosure of which is incorporated herein by reference.

In Application No. PCT/GB89/01116 there is described an apparatus for producing a variety of curved surface effects by the use of a so-called intermediate address store wherein there is represented, for each pixel of the output picture, the co-ordinates of the point in an input picture which is to be seen at that point in the output. This store is filled by a control system which generates arbitrary functions which are used to address it, and linear functions which are written to it.

One drawback of such a system is that if the scale of the picture information to be stored is increased in relation to the scale of the original picture information, then it is possible for locations in the intermediate address store to be left unwritten and to appear as holes in the final picture. This occurs because as the scale of the curved surface function providing the coordinates used to address the intermediate address store is increased, the corresponding coordinate values are provided to a resolution that is not sufficiently great to provide coordinate values corresponding to all addresses of the store. Thus, during the process of filling the store, some addresses of the store are skipped and remain unwritten. When data is then read from the store to enable addressing of a store containing picture information, gaps will appear in the information necessary to address the picture store and corresponding holes will appear in the visible image retrieved from the picture store.

In theory it would be possible to overcome the above problem by computing, from the coordinate values generated to a given scale by the arbitrary curved function, intermediate coordinate values at a resolution sufficient to enable complete addressing of the relevant store. In practise, however, the volume of data that would need to be processed in such a computation is such that would not be feasible for any known general purpose data processor to carry out the required computation in the real time available, i.e. in the period between reproduction of consecutive frames of a television picture signal.

It is accordingly one object of the invention to devise a process enabling the resolution of coordinate values that have been transformed to define a curved surface to be increased in relation to that provided by the original series of coordinates, which process is organised into steps such that coordinate values of increased resolution can be generated in real time by a data processing apparatus having respective stages dedicated to carry out corresponding steps of that process.

It is a further object of the invention to provide corresponding, novel individual stages of such a data processing apparatus.

It is a yet further object of the invention to provide a data processing apparatus comprising an appropriate association of said individual stages.

According to one aspect of the invention there is provided a process for deriving, from a set of two dimensional co-ordinate signals that have been transformed according to curved functions in order to represent relatively to a video image frame positions to be occupied by an image of a curved surface, intermediate values of the transformed co-ordinate signals to a resolution greater than that provided by said set, characterised in that it comprises the steps of:

a) providing within a memory store a look up table containing for each of a given number of two dimensional geometric figures within a given range of sizes a corresponding distribution of values of co-ordinate positions within the figure, such that the stored distributions collectively include substantially all possible distributions of such values that can occur within a given incremental area or range of areas of the image frame;

b) processing a set of said transformed co-ordinate signals to derive a plurality of subsets thereof, each of which includes a plurality of signals defining immediately adjacent co-ordinate positions at the corners of an area of the image frame of a given geometric shape;

c) processing at least some of said subsets of co-ordinate signals to derive a plurality of sets of further signals each defining an area of geometric shape and size corresponding to that of one of the geometric figures of the look up table, such that the respective areas defined by said sets of further signals collectively make up the whole area defined by the originating subset;

d) applying the sets of further signals to said memory store to retrieve for each area defined thereby a correspondingly stored distribution of co-ordinate values occurring therein; and e) combining the retrieved co-ordinate values with values derived from the set of transformed signals to provide a composite set of signals representing a continuous array of transformed co-ordinate positions having a predetermined maximum incremental spacing.

According to a further aspect of the invention there is provided a data processing device for use in the above-mentioned process, comprising means for processing a set of co-ordinate signals to derive therefrom a plurality of subsets of said signals each of which subsets includes a plurality of signals defining immediately adjacent co-ordinate positions at the corners of a given geometric area of a digital video image, and means for processing at least some of said subsets of signals to derive, for each said geometric area exceeding a given size, a plurality of further sets of co-ordinate signals corresponding to the co-ordinates of a plurality of smaller geometric areas of similar shape into which the first area can be subdivided, said smaller areas each lying within predetermined limits of size.

This aspect of the invention is hereinafter referred to as a 'predisector', and further features and advantages thereof will become apparent from the following description taken in conjunction with the drawings and appended claims.

In accordance with a yet further aspect of the invention there is provided a data processing device for use in the above-mentioned process comprising a memory store including a look up table containing for each of a finite number of two dimensional geometric figures within a given range of sizes a corresponding distribution of values of co-ordinate positions within the figure, said values being determined in accordance with vectors of corresponding linear sides of each figure, such that the stored distributions collectively include substantially all possible distributions of such values that can occur within a given incremental area of a video image frame; means for processing co-ordinate signals representing the corners of a geometric area of a video image frame to derive therefrom respective sets of further signals each defining a geometric figure corresponding to one of the geometric figures of the look up table; means for addressing said memory store with said sets of further signals to retrieve the correspondingly stored distributions of values, and means for providing from said co-ordinate signals and said distributions of values a continuous array of co-ordinate values extending within said geometric area.

This aspect of the invention will be referred to below as a 'hole filler' and further features and advantages thereof will also become apparent from the following description, drawings and appended claims.

According to a yet further aspect of the invention there is provided a data processing device comprising means for comparing signals defining the co-ordinate positions of corners of a geometric area with respective boundaries of a predetermined image frame, in order to provide output signals determining the presence or absence of each corresponding co-ordinate position within said image frame in a given co-ordinate direction, and means for logically combining said output signals to provide a corresponding control signal only when the said geometric area lies wholly outside said predetermined image frame.

This means will hereinafter be referred to as a 'detector', and further features and advantages thereof will become apparent from the following description, drawings and appended claims.

Figure 2:
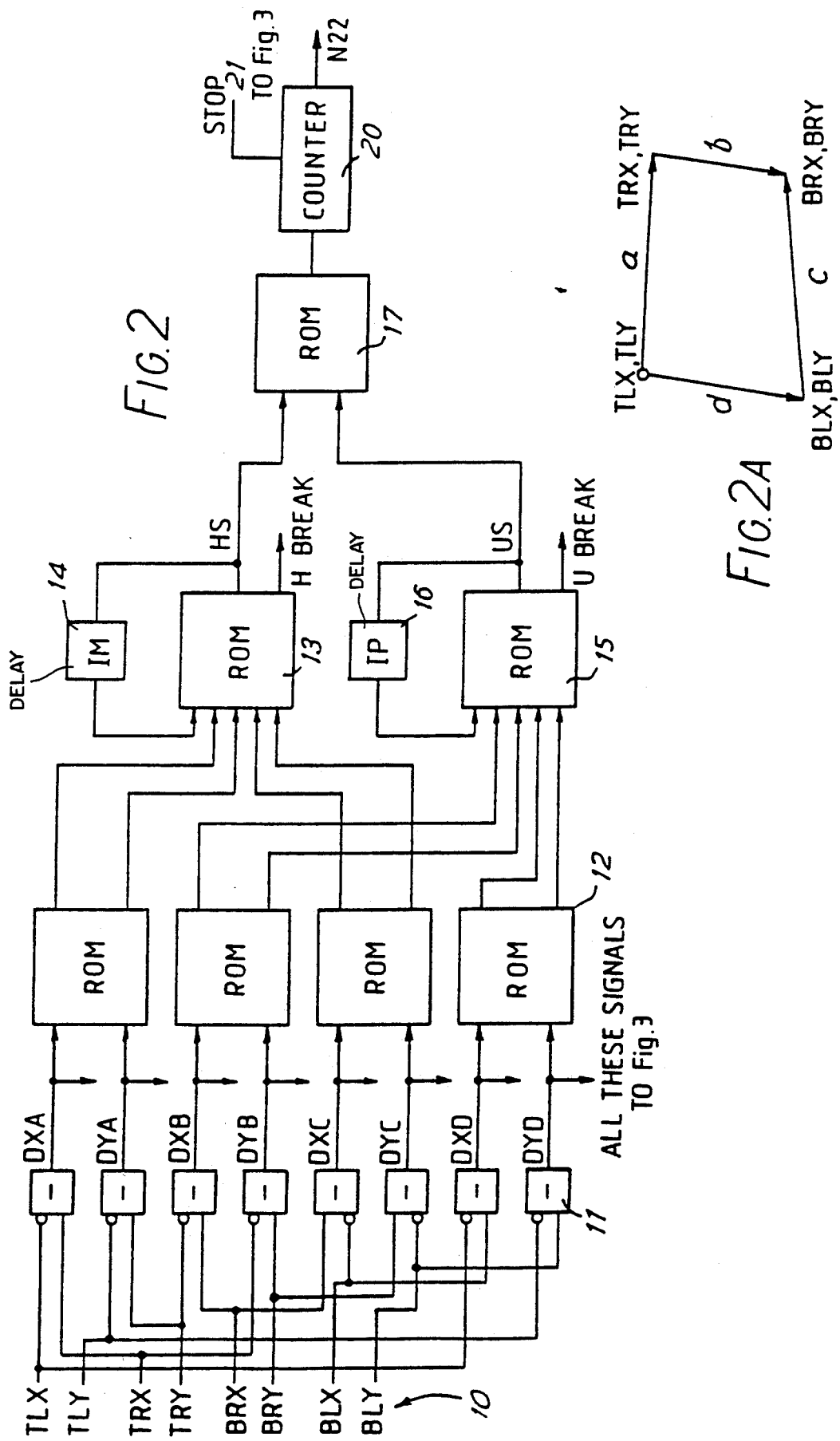
Figure 3:
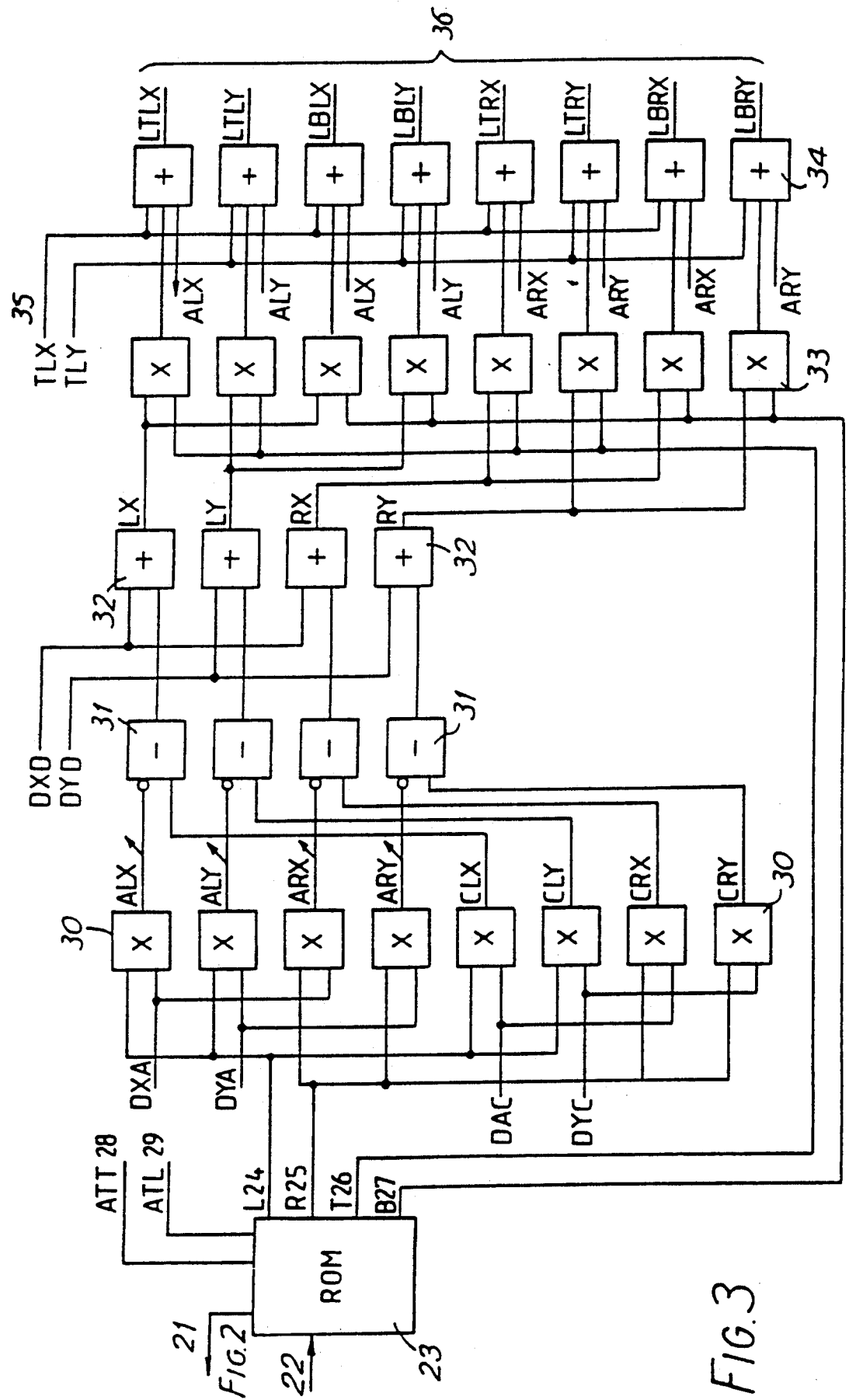
Figure 5:
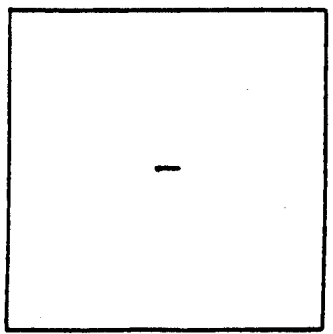
Figure 6:
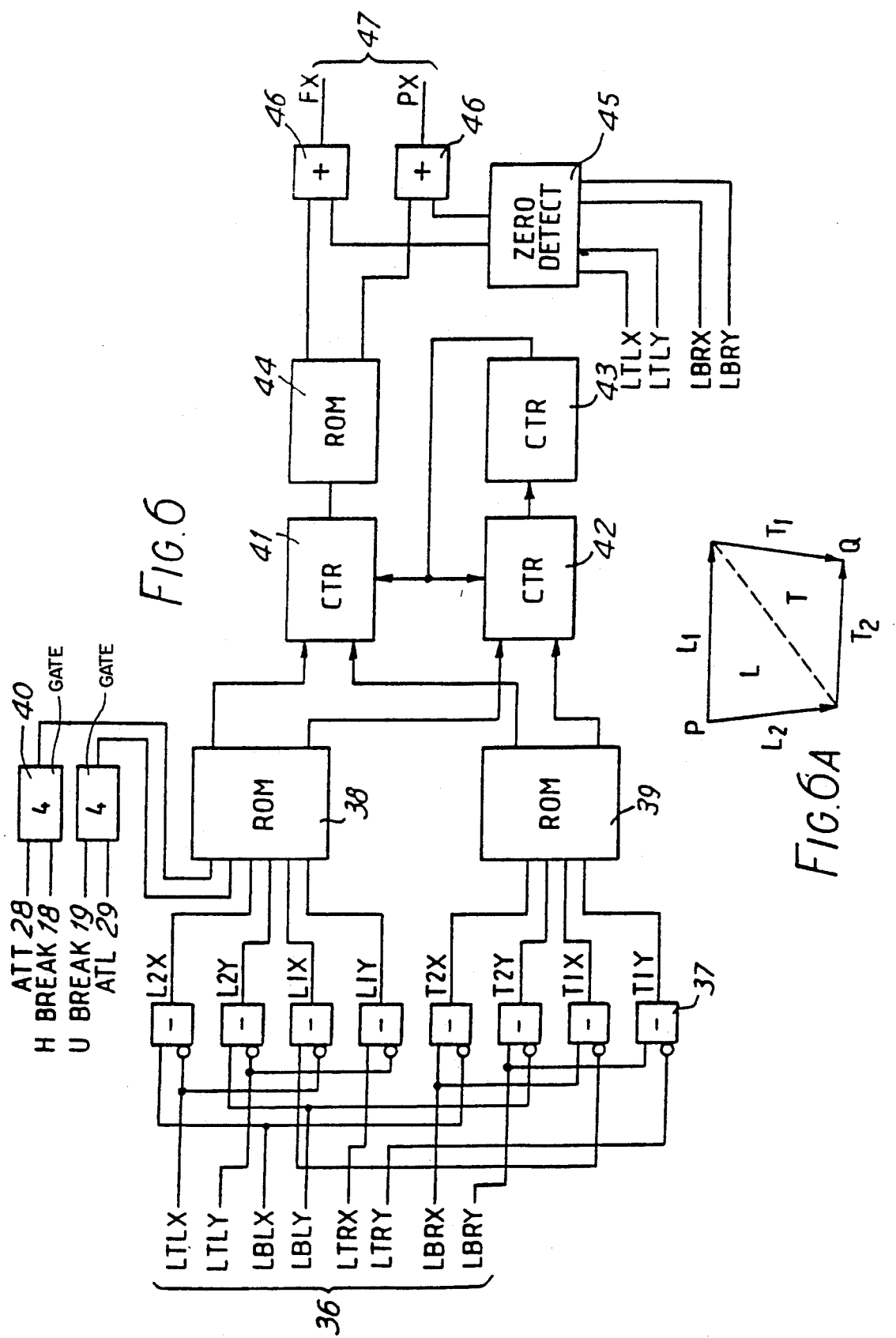
Figure 7:
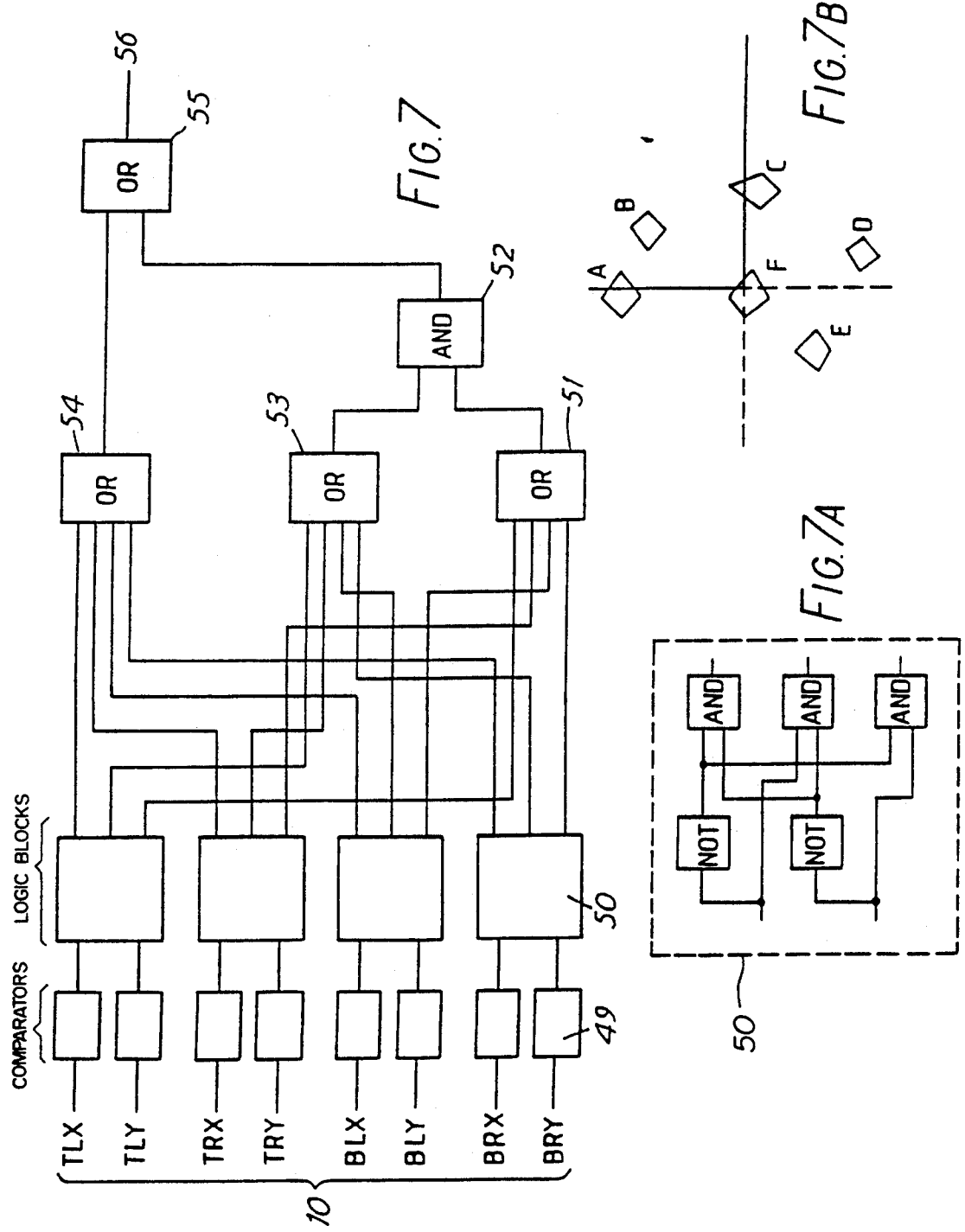

The invention is illustrated by way of example in the accompanying drawings, in which:

FIG. 1 is a diagrammatic view of a general arrangement of an apparatus for use with a digital video effects system for the production of curved surface effects and incorporating improvements in accordance with the present invention, FIGS. 2 and 3 are more detailed circuit diagrams of the predisector section of FIG. 1, FIG. 2A is a diagram explaining operation of a section of the circuit of FIG. 2, FIGS. 4 and FIGS. 5A-5C are diagrams illustrating the operation of the predisector section of FIGS. 2 and 3, FIG. 6 is a more detailed circuit diagram of the hole-filler section of FIG. 1, FIG. 6A is a diagram explaining operation of a section of the circuit of FIG. 6, FIG. 7 is a more detailed circuit diagram of the detector section of FIG. 1, FIG. 7A illustrates a detail of FIG. 7, FIG. 7B is a diagram illustrating the operation of the circuit of FIG. 7, and FIGS. 8, 9, 10 and 10A are more detailed circuit diagrams of parts of an interpolator section of FIG. 1.

Referring to the drawings the general arrangement of one embodiment of digital video effects in accordance with the invention is shown in FIG. 1. A function generator 1 and transformation system 2 corresponds to the elements of FIGS. 1 and 2 of the system described in International Application PCT/GB89/01116 for addressing and writing into an intermediate address store corresponding to the address store illustrated at 8 in FIG. 1. The interpolator 7 also includes elements equivalent to those of FIG. 3 of PCT/GB89/01116. The remaining elements 3, 4, 5 and 48 interposed between the transformation system 2, the interpolator 7 and the store 8 constitute additions in accordance with the present invention. It will be appreciated that in FIG. 1 the single lines indicate data buses. For example the single lines issuing from the transformation system 2 are data buses providing all of the X, Y and Z addressing signals in the manner described in the aforementioned International Application.

The function generator I produces, in normal left to right and top to bottom scanning order, the X, Y and Z co-ordinates to which selected pixels of the input picture are to be transformed by the effect in progress. To produce an economy in the hardware required only one pixel in N horizontally, and one line in M vertically are processed by the function generator. Typical values for N and M are two, four or eight, but the invention will work with other values.

The signals representing X, Y and Z co-ordinates of a pixel in space are passed though line and pixel time delays 3 in order to obtain the co-ordinates of a box, referred to as a "big pixel", having as its four corners two consecutive outputs from the function generator, and the two corresponding outputs on the previous line.

The X and Y co-ordinates at this stage may be regarded as being whole numbers which define the addresses within the intermediate address store at which the data is to be written, and fractions which are used in subsequent calculations to determine the data to be written.

The action of the subsequent stages, being the predisector 4 and hole filler 5 is to walk through the intermediate address store locations enclosed by the big pixel, visiting each point exactly once, so that addresses within the store 8 lying between addresses corresponding to consecutive outputs of the function generator can be accessed and written with data.

The invention also ensures that the boundaries between big pixels match exactly, each intermediate address store location lying on a boundary being, if possible, visited exactly once. It will be appreciated that although it is essential that all relevant available addresses of the store should be visited once, to avoid the appearance of holes, the object in preventing any location from being visited more than once is simply to avoid redundant processing and corresponding wasted processing time. Occasional duplication of addresses can therefore be tolerated.

The hole filler 5 contains look up tables (to be described later) of how to set about visiting every point in any possible quadrilateral up to a maximum size. However, the size of these tables depends on the fourth power of the linear size and hence the predisector 4 is used to cut the big pixel into rectangles known as "little pixels" which are given to the hole filler 5. This reduces the size of the tables to manageable proportions.

The horizontal and vertical co-ordinates of the pixel being processed are obtained from the counters 6, which correspond to the counters 3 of FIG. 1 of PCT.GB89/01116, and the interpolator 7 derives the corresponding integer values of the intermediate address store addresses and data by means equivalent to the elements 23 of FIG. 3 of PCT/GB89/01116. Fractional values from the counters 6 and time delays 3 as well as values derived directly from the hole filler 5 are provided to the interpolator 7, for the correction of data to be written, and to the store 8, as addressing values. The data is written at the derived address to the intermediate address store 8, from which it is read at 9.

The predisector is shown in FIGS. 2 and 3. The co-ordinates of the corners of the big pixel are accepted at 10, the fractional parts of the co-ordinates and the Z co-ordinates not being used at this stage. The nomenclature of the signals is as follows:

| | |
|---|---|
| TLX | X co-ordinate of Top Left corner |
| TLY | Y co-ordinate of Top Left corner |
| TRX | X co-ordinate of Top Right corner |
| TRY | Y co-ordinate of Top Right corner |
| BLX | X co-ordinate of Bottom Left corner |
| BLY | Y co-ordinate of Bottom Left corner |
| BRX | X co-ordinate of Bottom Right corner |
| BRY | Y co-ordinate of Bottom Right corner |

The signals are then subtracted by the subtractors 11 to produce the X and Y components of the four vectors lettered a, b, c and d which bound the big pixel. Note that the designations top, bottom, left and right refer to the untransformed pixel, after transformation the pixel may be in any orientation. The relations of the named points and vectors is shown in FIG. 2A.

The vectors are then used to address the read only memories 12 which are filled with a pattern which evaluates the maximum and minimum number of sections into which the vector may be broken in order to satisfy two requirements, firstly that a vector must not be broken into more sections than there are units in its length, secondly that it may not be broken into so few sections that the sections are too large for the hole filler to deal with. Typically, the maximum length that the hole filler can deal with is 7 units.

The number of sections in to which a vector is to be broken, known as the degree of disection, is expressed as the logarithm to base two of the number of sections, thus if a vector is to be broken into four sections the number 2 is used, for eight sections the number 3 and so on. The minimum and maximum values are also coded as a minimum and a difference or range in order to reduce the amount of hardware needed. All of this coding is carried out by the read only memory 12.

The read only memories 13 and 15 decide the degree of disection to use in the horizontal (13) and vertical (15) directions. The degree of disection used for the big pixel above is known via the line delay 14 and for the big pixel to the left via the pixel delay 16. The read only memories 13 and 15 are programmed with a pattern that evaluates the range of allowable expansions consistent with the two minima and ranges from the read only memories 12, and chooses the closest value to the previous degree of disection that is consistent with the limits.

The two numbers from these read only memories are used to address the read only memory 17 which produces a single number which is loaded into the counter 20. The read only memories 13 and 15 also produce two break signals 18 and 19 which indicate that the number output is not the same as the number re-entered via the delays 14 and 16.

The action of the stages so far is to produce two numbers which indicate the number of sections into which the big pixel should be split horizontally and vertically. These numbers are changed as rarely as possible, and when they are changed a break signal is generated to indicate that this has happened. The two numbers generated are used to generate a starting value for a counter.

On FIG. 3 the number from the counter addresses a read only memory 23 which produces output signals 24 to 29 and a flag 21. The flag causes the counter to stop and signals that operations for this big pixel are complete.

The signals 28 and 29 indicate that the first row and column respectively of little pixels are being output.

The pattern in this read only memory 23 is designed to walk through all of the little pixels into which a big pixel is cut in an arbitrary order. It outputs the top, bottom, left and right edges of the little pixels as binary fractions. Referring to FIG. 5, a few typical sequences may be seen. In sequence A the pixel is effectively not disected, that is to say both the horizontal and vertical numbers from 13 and 15 are zero and the counter 20 will take only one state before stopping. In this state the read only memory 23 will output top and left as zero and right and bottom as 1. In the case of sequence 6 the pixel is cut into four horizontally and two vertically, 13 is outputting 2 and 15 is outputting 1. The counter takes eight states and the numbers output from the read only memory are given in the following table:

| State | Left 24 | Right 25 | Top 26 | Bottom 27 |
|---|---|---|---|---|
| 0 | 0 | $\frac{1}{4}$ | 0 | $\frac{1}{2}$ |
| 1 | $\frac{1}{4}$ | $\frac{1}{2}$ | 0 | $\frac{1}{2}$ |
| 0 | $\frac{1}{2}$ | $\frac{3}{4}$ | 0 | $\frac{1}{2}$ |
| 0 | $\frac{3}{4}$ | 1 | 0 | $\frac{1}{2}$ |
| 0 | 0 | $\frac{1}{4}$ | $\frac{1}{2}$ | 1 |
| 1 | $\frac{1}{4}$ | $\frac{1}{2}$ | $\frac{1}{2}$ | 1 |
| 0 | $\frac{1}{2}$ | $\frac{3}{4}$ | $\frac{1}{2}$ | 1 |
| 0 | $\frac{3}{4}$ | 1 | $\frac{1}{2}$ | 1 |

In the case C the pixel is cut into two both horizontally and vertically. The counter takes four states as follows:

| State | Left 24 | Right 25 | Top 26 | Bottom 27 |
|---|---|---|---|---|
| 0 | 0 | $\frac{1}{2}$ | 0 | $\frac{1}{2}$ |
| 0 | $\frac{1}{2}$ | 1 | 0 | $\frac{1}{2}$ |
| 0 | 0 | $\frac{1}{2}$ | $\frac{1}{2}$ | 1 |
| 0 | $\frac{1}{2}$ | 1 | $\frac{1}{2}$ | 1 |

Figure 4:
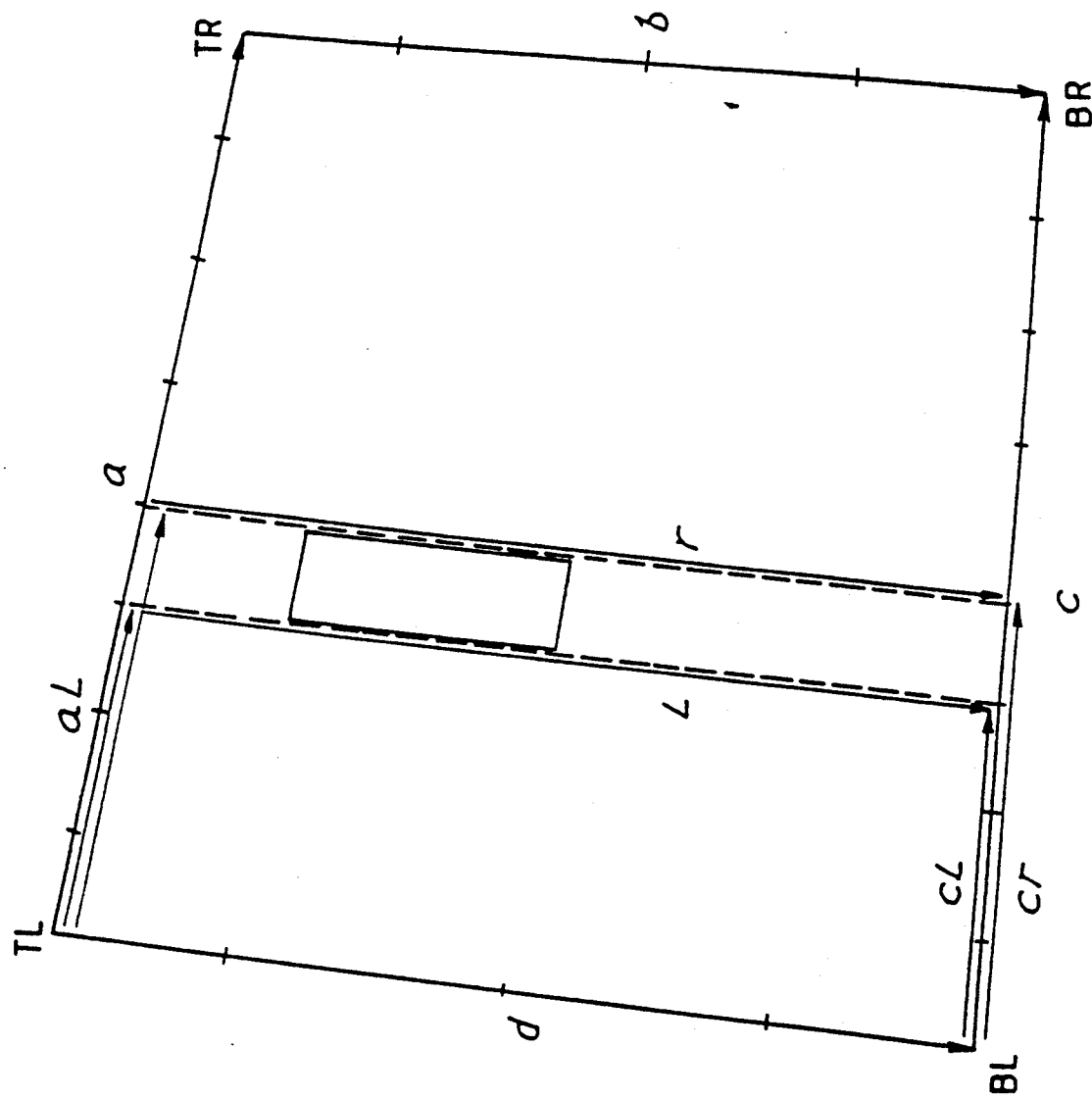

Referring to FIG. 4, to obtain the co-ordinates of the little pixel shown which has left and right edges at $\frac{1}{4}$ and $\frac{1}{2}$ and top and bottom edges at $\frac{1}{4}$ and $\frac{1}{2}$, first find the fractional vectors representing the top and bottom vectors a and c divided in proportion by the left and right fractions. These vectors are denoted by al, ar, cl and cr. Then find the left and right vectors l and r, then divide these in proportion to the top and bottom fractions.

This operation is performed by the arrangement shown in FIG. 3. The multipliers 30 obtain the x and y components of vectors al, ar, cl and cr. The subtractors 31 and adders 32 then obtain the X and Y components of the left and right vectors. These are then multiplied by the top and bottom fractions in the multipliers 33 and added to numbers from the multipliers 30 and co-ordinates of the top left hando corner 35 (these are the same numbers as at 10) in order to produce the co-ordinates of the corners of the little pixel 36. These co-ordinates are named LTLX (little top left X) to LBRY (little bottom right Y).

In subsequent paragraphs an intermediate address store location will be referred to as a point in the interests of brevity.

Having located the little pixel the hole filler (5 on FIG. 1) is used to visit each point within the little pixel exactly once. The hole filler is also designed to ensure that, as far as possible, points that lie on the boundary between two little pixels are visited only by one of the adjoining pixels.

The basic principle of the hole filler is to divide the little pixel into two triangles called "leading" and "trailing", the leading triangle representing the top left of the original source information. Each triangle is then processed separately. The advantage of this is approach is that the number of distinct shapes of triangles is much smaller than the number of rectangles, and hence it is possible to have a lookup table of all distinct triangles. That is to say that, since the contents of a triangle of any given shape are defined digitally by pixels distributed within the triangle in a pattern determined by the vectors of two sides of the triangle, and since the maximum number of pixels along either vector is limited so that the scope for variation between triangles of different shape and size is correspondingly limited by the incremental value of a pixel, it is possible to store within a memory of reasonable size the contents of all possible triangles that may be required to follow the vectors of a curved surface to be reproduced in the digital video image.

The lookup table provides a list of offsets in the horizontal and vertical directions, respectively between the apex of a triangle (point P or Q in FIG. 6A), and the individual points to be visited in order to fill in the triangle.

The co-ordinates of the corners of the little pixel are subtracted at 37 to give the lengths of the four vectors L1, L2, T1 and T2 which define the little pixel. The vectors defining the leading triangle are used to address the read only memory 38, which is also addressed by two other bits which will be described later, the trailing triangle is processed similarly by 39.

Both read only memories 38 and 39 output two numbers, one of which is the number of points to be visited, the other is the address in read only memory 44 of the first point. The counters 41 and 42 are loaded with the two numbers, first for the trailing, then the leading triangles. The counter 41 counts up and 42 down until the detector 43 finds zero, then the process stops and new data is accepted at the input.

A list of vectors read from the read only memory 44 is added to the vertex of the current triangle selected by the switch 45 by the adder 46 to give the co-ordinates of the point to be visited.

The patterns in the read only memories are chosen so that, provided the predisector does not change its degree of disection and the little pixels remain reasonably large (more than one point wide) then the system as a whole will write to each point exactly once. To achieve this the list of points visited by a pair of triangles includes all points lying along the trailing vectors T1 and T2, but not the points lying along the leading vectors as these will be visited by the trailing vector of an adjacent pixel.

If the predisector does change its degree of disection then it is possible that the leading and trailing vectors will not match, as two little pixels from one big pixel may be trying to match one from another. In this case the gates 40 will be used to correct the sequence.

The four signals presented to the gates are as follows;

| | |
|---|---|
| ATT | "At Top", true for the first row of pixels from the predisector. |
| ATL | "At Left", true for the first column. |
| HBREAK | True if the horizontal degree of disection is not the same as was used for the big pixel above. |
| VBREAK | True if the vertical degree of disection is not the same as was used for the big pixel to the left. |

If the predisector changes its vertical degree of disection, then on the next big pixel the VBREAK signal 19 will be true. The ATL signal will also be true for the first column of little pixels, and so the read only memory 38 will receive a different address. This will cause a different sequence of points to be filled, including those lying along the L2 vector. This may cause some points to be visited twice, but will guarantee that all points are visited once.

The detector (48 on FIG. 1) is used to identify big pixels which lie entirely off screen. When such a pixel is detected it turns off the predisector completely, saving the time that it and the hole filler would have taken.

The arrangement of the detector is shown in FIG. 7. The co-ordinates of the corners of the big pixel are sent to the comparators 49 which have an output which is logically true if its input lies outside a range of values which represent the available screen height or width. The comparator outputs go to the logic blocks 50, the internal arrangement of each of which is shown in FIG. 7A. The outputs are then combined by the gates 51 to 55 to produce the signal 56 which is true if the big pixel lies wholly or partly within the screen.

The way in which the detector works is as follows. The Output of gate 51 is true if any corner is off screen in the Y direction but not in the X, 53 if any corner is off screen in the X direction but not the Y, and 54 if any corner is on screen in both directions.

FIG. 7B shows the bottom left hand corner of the screen and a few possible positions for the big pixel. Positions A, B and C have at least one corner completely on the screen, and hence the output of gate 54 and the output of the detector is true for them. Position D is on screen in the X direction, but off screen in the Y hence the output of gate 51 is true, but the outputs of gates 53 and 54 are false, so the output is false. For position E the outputs of all gates are false. For position F however, despite the fact that all corners are off screen, the outputs of both gates 51 and 53 are true so the output is true.

This scheme will detect and mark as on screen all pixels that are even partly on screen, including difficult cases such as F.

The interpolator (7 on FIG. 1) takes the co-ordinates of the four corners of the big pixel and the output of the hole filler and creates the data to be written to the intermediate address store.

Note that the interpolator makes use of the fractional parts of the various co-ordinates and vectors, whereas the hole filler and predisector do not.

Figure 8:
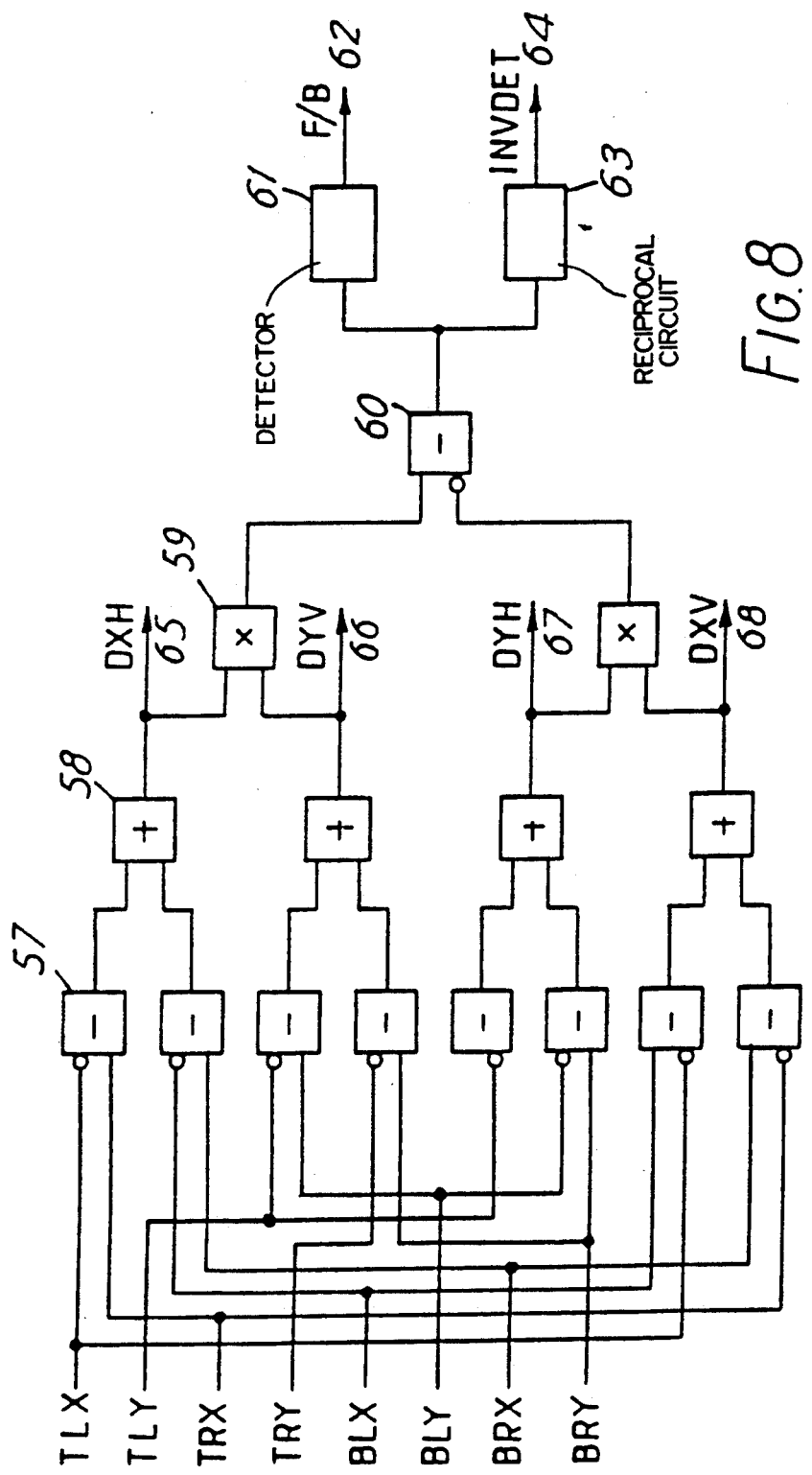

The interpolator consists of several parts. The first is shown in FIG. 8, which is the inverse determinant calculation. The co-ordinates of the corners of the big pixel are processed by subtractors 57, adders 58, multipliers 59 and subtractor 60 to give a number which is the determinant of the matrix of partial differentials of vectors in the output co-ordinate system with respect to the input. This number has two uses, it is sent to the detector 61 which produces the signal 62 which is true if the number is negative. This signal 62 indicates that the back of the picture is visible. The same number is passed to the reciprocal circuit 63 which produces at 64 a number which is inversely proportional to the determinant.

The numbers DXH, DYH, DXV and DYV are produced at 65 to 68, these represent the X and Y components of the transformation into output space of the vectors forming the sides of the big pixel in input space.

Figure 9:
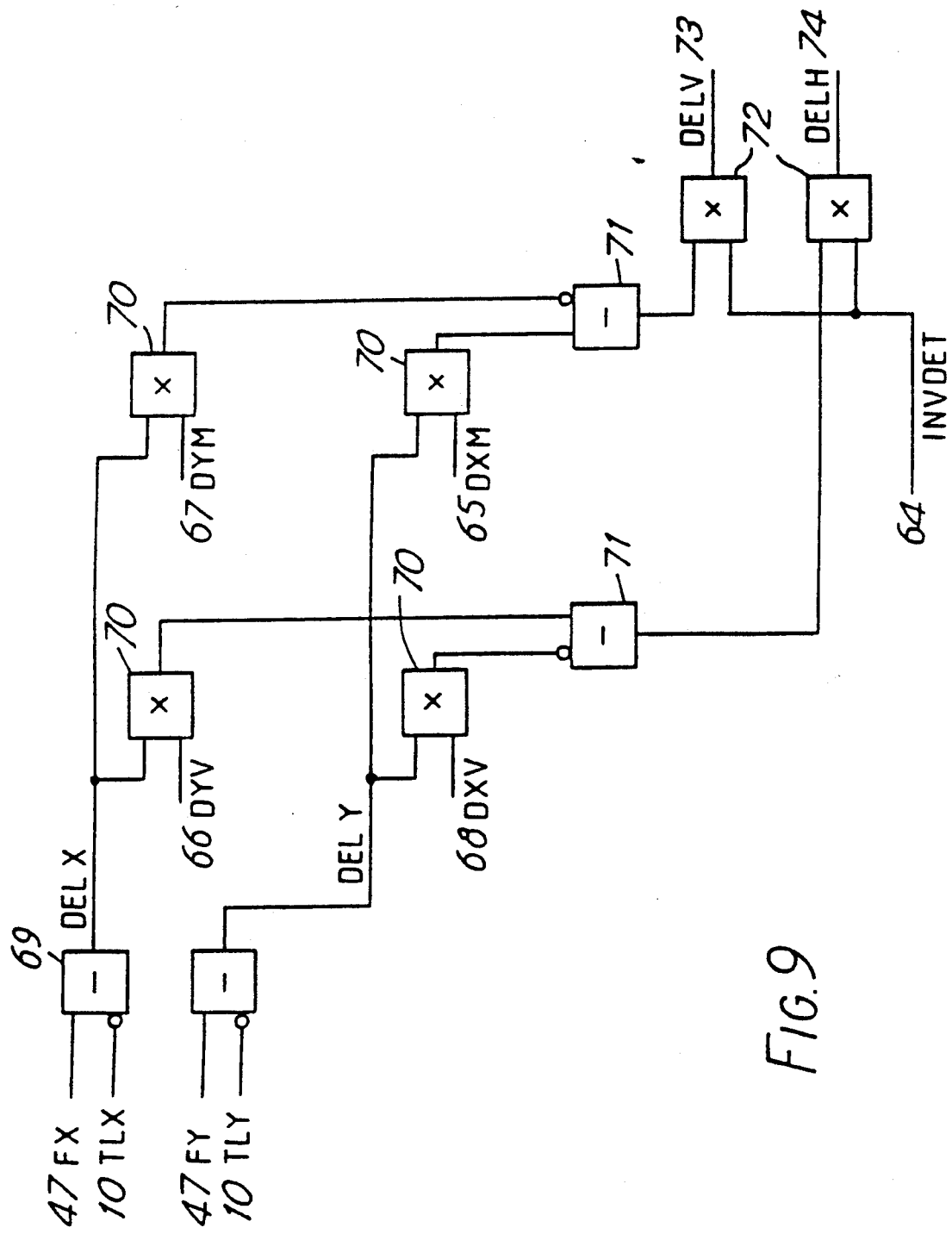

The generation of the data is performed by the arrangement shown in FIG. 9. The subtractors 69 produce the components of a vector from the top left corner of the big pixel to the point currently being written. This vector is then transformed by the multipliers 70 and 72 and the subtractors 71 to give the corresponding vector in input geometry, DELV and DELH at 73 and 74.

FIG. 10 shows the arrangement by which the final numbers are computed. The displacements 73 and 74 are added at 76 to the co-ordinates in the source picture of the big pixel to produce the horizontal and vertical numbers written to the intermediate address store. The limits 75 impose a maximum value of about four big pixels, positive or negative, on DELH and DELV.

The Z co-ordinates from the delays (3 on FIG. 1) are subtracted at 79 to obtain rates of change. These are then multiplied by the displacements, limited to plus or minus one pixel at 80 with the multiplier 81 and added to the original co-ordinate at 82 to produce the Z value to write to the intermediate address store 83.

The adders 84 produce a different pair of co-ordinates, which is compared with horizontal and vertical high and low limits, manually adjusted. The results of the comparisons are combined by the gate 86 to produce an enable signal 87. This signal is normally true, but will go false outside the rectangular region defined by the limits. This signal can be used to suppress or enable writing to the IAS in order to clip the picture to a smaller size.

We claim:

1. A process for deriving from a set of two dimensional co-ordinate signals that have been transformed according to curved functions in order to represent, relative to a video image, frame positions to be occupied by an image of a curved surface, intermediate values of the transformed coordinate signals to a resolution which is greater than that provided by said set, the method comprising the steps of:
   a) providing within a memory store a look up table containing for each of a given number of two dimensional geometric figures within a given range of sizes a corresponding distribution of values of co-ordinate positions within each figure, such that the stored distributions collectively include substantially all possible distributions of such values that can occur within a given incremental area or range of areas of the image frame;
   b) processing a set of said transformed co-ordinate signals to derive a plurality of subsets thereof, each of which includes a plurality of signals defining immediately adjacent co-ordinate positions at the corners of an area of the image frame of a given geometric shape;
   c) processing at least some of said subsets of co-ordinate signals to derive a plurality of sets of further signals each defining an area of geometric shape and size corresponding to that of one of the geometric figures of the look up table, such that the respective areas defined by said sets of further signals collectively make up the whole area defined by the originating subset;
   d) addressing said memory store with the sets of further signals to retrieve for each area defined thereby a correspondingly stored distribution of co-ordinate values occurring therein; and
   e) combining the retrieved co-ordinate values with value derived from the set of transformed signals to provide a composite set of signals representing a continuous array of transformed co-ordinate positions having a predetermined maximum incremental spacing.

2. A process according to claim 1, wherein the said two dimensional geometric figures for which distributions of values of co-ordinate positions are stored in said look up table are triangles.

3. A process according to claim 2, wherein the said subsets of signals derived from the set of transformed signals are subsets of four signals representing immediately adjacent co-ordinates in the horizontal and vertical directions of the image frame that collectively define the corners of a quadrilateral area, and wherein at least some of said subsets of four signals are each processed to derive, for each quadrilateral area exceeding a given size, a plurality of further sets of co-ordinate signals corresponding to the co-ordinates of a plurality of smaller quadrilateral areas into which the first quadrilateral area can be subdivided, said smaller quadrilateral areas each lying within predetermined limits of size.

4. A process according to claim 3, wherein each of the sets of further signals is derived by processing the co-ordinate signals defining one of said quadrilateral areas or one of said smaller quadrilateral areas to obtain vector signals corresponding to two sides of each of leading and trailing triangular areas into which the quadrilateral are is divided diagonally.

5. A process according to claim 1, wherein the co-ordinate positions defined by each subset of signals are logically compared to a co-ordinate area of the image frame to detect any such set of signals for which the corresponding geometric area lies wholly outside the co-ordinate area of the image frame, and processing is terminated in respect of any subset of signals so detected.

6. A data processing device for deriving from a set of two dimensional co-ordinate signals that have been transformed according to curved functions in order to represent, relative to a video image, frame positions to be occupied by an image of a curved surface, intermediate values of the transformed co-ordinate signals to a resolution which is greater than that provided by said set, the data processing device comprising:
   means for processing said set of transformed co-ordinate signals to derive therefrom a plurality of subsets of said signals each of which subsets includes a plurality of signals defining immediately adjacent co-ordinate positions at the corners of a given geometrical area of a digital video image, and means for processing at least some of said subsets of signals to derive, for each of said geometric areas exceeding a given size, a plurality of further sets of co-ordinate signals corresponding to the co-ordinates of a plurality of smaller geometric areas of similar shape into which the first area can be subdivided, said smaller areas each lying within predetermined limits of size.

7. A device according to claim 6, wherein said subsets each comprise four signals defining the corners of a quadrilateral area.

8. A device according to claim 7, wherein said means for processing said set of co-ordinate signals comprises delay means for receiving a set of co-ordinate signals provided serially in the form of a digital video signal, and for providing at respective outputs signals delayed relatively to one another by the period of one pixel in the horizontal direction and one line in the vertical direction, whereby said respective outputs provide said plurality of subsets of signals consecutively in synchronism with the received signal.

9. A device according to claim 7, wherein said means for processing said subsets of signals comprises means for subtracting respective signals of each subset to determine the values of the horizontal and vertical components of the vectors of the respective sides of the corresponding quadrilateral area, means for comparing said values in order to determine a number of sections into which said quadrilateral area may be divided in horizontal and vertical directions in order that the magnitude of each section in the horizontal and vertical directions shall lie between predetermined limits and for providing a corresponding output signal, means responsive to said output signal for providing, consecutively, output signals representative of the corresponding fractional division of said vector components of the quadrilateral area by the respective sides of smaller quadrilateral areas into which it is to be divided, and means for computing from said vector components and said output signals, the respective co-ordinates of the corners of each said smaller quadrilateral area.

10. A data processing device for deriving from a set of two dimensional co-ordinate signals that have been transformed according to curved functions in order to represent, relative to a video image, frame positions to be occupied by an image of a curved surface, intermediate values of the transformed co-ordinate signals to a resolution which is greater than that provided by said set, the data processing device comprising:

a memory store including a look up table containing for each of a finite number of two dimensional geometric figures within a given range of sizes a corresponding distribution of values of co-ordinate positions within the figure, said values being determined in accordance with vectors of corresponding liner sides of each figure, such that the stored distributions collectively include substantially all possible distributions of such values that can occur within a given incremental area of a digital video image frame; means for processing co-ordinate signals representing the corners of a geometric area of a video image frame to derive therefrom respective sets of further signals each defining a geometric figure corresponding to one of the geometric figurers of the look up table; means for addressing said memory store with said sets of further signals to retrieve the correspondingly stored distributions of values, and means for generating from said co-ordinate signals and said distributions of values a continuous array of co-ordinate values extending within said geometric area.

11. A data processing device according to claim 10, wherein said two dimensional geometric figures are triangles and said geometric area is a quadrilateral.

12. A data processing device for deriving from a set of two dimensional co-ordinate signals that have been transformed according to curved functions in order to represent, relative to a video image, frame positions to be occupied by an image of a curved surface, intermediate values of the transformed co-ordinate signals to a resolution which is greater than that provided by said set, the data processing device comprising:

transformed co-ordinate signal processing means for processing said set of transferred co-ordinate signals to derive therefrom a plurality of subsets of said signals each of which subsets includes a plurality of signals defining immediately adjacent co-ordinate positions at the corners of a given geometric area of a digital video image, and means for processing at least some of said subsets exceeding a given size, a plurality of further sets of co-ordinate signals corresponding to the co-ordinates of a plurality of smaller geometric areas of similar shape into which the first area can be subdivided, said smaller areas each lying within predetermined limits of size;

a memory store including a look up table containing for each of a finite number of two dimensional geometric figures within a given range of sizes a corresponding distribution of values of co-ordinate positions within the figure, said values being determined in accordance with vectors of corresponding linear sides of each figure, such that the stored distributions collectively include substantially all possible distributions of such values that can occur within a given incremental area of a digital video image frame; means for processing co-ordinate signals representing the corners of a geometric area of a video image frame to derive therefrom respective sets of further signals each defining a geometric figure corresponding to one of the geometric figures of the look up table; means for addressing said memory store with said sets of further signals to retrieve the correspondingly stored distribution of values, and means for providing from said co-ordinate signals and said distributions of values of continuous array of co-ordinate values extending within said geometric area, wherein the further sets of co-ordinate signals of said transformed co-ordinate signal processing means are provided to the memory store as said co-ordinate signals, and wherein the means for processing said subsets of signals is further arranged to provide to said means for processing said further sets of control signals for avoiding redundancy in the retrieval of stored values corresponding to matching boundaries of adjacent ones of said smaller geometric areas.

13. A data processing device for deriving from a set of two dimensional co-ordinate signals that have been transformed according to curved functions in order to represent, relative to a video image, frame positions to be occupied by an image of a curved surface, intermediate values of the transformed co-ordinate signals to a resolution which is greater than that provided by said set, the data processing device comprising:

a) means for processing said set of transformed co-ordinate signals to derive therefrom a plurality of subsets of said signals defining immediately adjacent co-ordinate positions at the corners of a given geometric area of a digital video image;

b) means for comparing said subsets of signals with respective boundaries of a predetermined image frame, in order to provide output signals determining the presence or absence of each corresponding co-ordinate position within said image frame in a given co-ordinate direction, and means for logically combining said output signals to provide a corresponding control signal only when said geometric area lies wholly outside said predetermined image frame; and c) means for processing said subsets of signals to derive, for each said geometric area exceeding a given size, a plurality of further sets of co-ordinate signals corresponding to the co-ordinates of a plurality of smaller geometric areas of similar shape into which the first area can be subdivided, said smaller areas each lying within predetermined limits of size; said means for processing said subsets of signals being inhibited in response to said control signal.

14. A data processing device for enabling stored video images to be processed to reproduce image information from one image frame of a video signal so that it appears within another image frame of a video signal as if transposed onto a curved surface, the data processing device comprising:

means for generating a first set of co-ordinate signals the values of which represent the co-ordinate positions of image information within a store containing the picture information of said one image frame;

means for transforming the values of said first set of co-ordinate signals according to functions defining the desired curved surface in order to derive a second set of co-ordinate signals the values of which represent the co-ordinate positions within said other image frame at which the said curved surface will appear;

means for processing said second set of co-ordinate signals to derive therefrom a plurality of subsets of said signals each of which subsets includes a plurality of signals defining immediately adjacent co-ordinate positions at the corners of a given geometric area of a digital video image;

subset processing means for processing at least some of said subsets of signals to derive, for each said geometric area exceeding a given size, a plurality of further sets of co-ordinate signals corresponding to the co-ordinates of a plurality of smaller geometric areas of similar shape into which the first area can be subdivided, said smaller areas each lying within predetermined limits of size, said subset processing means comprising:

a memory store including a look up table containing for each of a finite number of two dimensional geometric figures within a given range of sizes a corresponding distribution of values of co-ordinate positions within the figure, said values being determined in accordance with vectors of corresponding linear sides of each figure, such that the stored distributions collectively include substantially all possible distributions of such values that can occur within a given incremental area of a digital video image frame; means for addressing said memory store with said subsets of signals to retrieve the correspondingly stored distributions of values as said further sets of co-ordinate signals; means for generating from said second set of co-ordinate signals and said further sets of co-ordinate signals output signals comprising a continuous array of co-ordinate values extending within said geometric area; a data store, means for addressing said data store with the said output signals of the said subset processing means and means for writing into said data store values derived from said first set of co-ordinate signals whereby at each co-ordinate address of the store defined by said out signals there are stored corresponding values of input co-ordinates.

15. A data processing device for enabling stored video images to be processed to reproduce image information from one image frame of a video signal so that it appears within another image frame of a video signal as if transposed onto a curved surface, the data processing device comprising:

means for generating a first set of co-ordinate signals the values of which represent the co-ordinate positions of image information within a store containing the picture information of said one image frame;

means for transforming the values of said first set of co-ordinate signals according to functions defining the desired curved surface in order to derive a second set of co-ordinate signals the values of which represent the co-ordinate positions within said other image frame at which the said curved surface will appear;

means for processing said second set of co-ordinate signals to derive therefrom a plurality of subsets of said signals each of which subsets includes a plurality of signals defining immediately adjacent co-ordinate positions at the corners of a given geometric area of a digital video image; subset processing means for processing at least some of said subsets of signals to derive, for each said geometric area exceeding a given size, a plurality of further sets of co-ordinate signals corresponding to the co-ordinates of a plurality of smaller geometric areas of similar shape into which the first area can be subdivided, said smaller areas each lying within predetermined limits of size, said subset processing means comprising:

a memory store including a look up table containing for each of a finite number of two dimensional geometric figures within a given range of sizes a corresponding distribution of values of co-ordinate positions within the figure, said values being determined in accordance with vectors of corresponding linear sides of each figure, such that the stored distributions collectively include substantially all possible distributions of such values that can occur within a given incremental area of a digital video image frame; and means for addressing said memory store with said subsets of signals to retrieve the correspondingly stored distributions of values as said further sets of co-ordinate signals; means for providing from said second set of co-ordinate signals output signals comprising a continuous array of co-ordinate values extending within said geometric area; a data store, means for addressing said data store with the said output signals of the said subset processing means, and means for writing into said data store values derived from said first set of co-ordinate signals whereby at each co-ordinate address of the store defined by said output signals there are stored corresponding values of input co-ordinates; said writing means comprising an interpolator arranged to receive fractional values of said first set of co-ordinate signals together with the said output signals of said subset processing means and to compute said derived values to be written to the data store.

16. A data processing device for enabling stored video images to be processed to reproduce image information from one image frame of a video signal so that it appears within another image frame of a video signal as if transposed onto a curved surface, the data process device comprising:

means for generating a first set of co-ordinate signals the values of which represent the co-ordinate positions of image information within a store containing the picture information of said one image frame;

means for transforming the values of said first set of co-ordinate signals according to functions defining a desired curved surface in order to derive a second set of co-ordinate signals the values of which represent the co-ordinate positions within said other image frame at which the said curved surface will appear;

means for processing said second set of co-ordinate signals to derive therefrom a plurality of subsets of said signals each of which subsets includes a plurality of signals defining immediately adjacent co-ordinate positions at the corners of a given geometric area of a digital video image;

subset processing means for processing at least some of said subsets of signals to derive, for each of said geometric areas exceeding a given size, a plurality of further sets of co-ordinate signals corresponding to the co-ordinates of a plurality of smaller geometric areas of similar shape into which the first area can be subdivided, said smaller areas each lying within predetermined limits of size, said subset processing means comprising a memory store including a look up table containing for each of a finite number of two dimensional geometric figures within a given range of sizes a corresponding distribution of values of co-ordinate positions within the figure, said values being determined in accordance with vectors of corresponding linear sides of each figure, such that the stored distributions collectively include substantially all possible distributions of such values that can occur within a given incremental area of a digital video image frame; and means for addressing said memory store with said subsets of signals to retrieve the correspondingly stored distributions of values as said further sets of co-ordinate signals;

means for generating from said second set of co-ordinate signals and said further sets of co-ordinate signals output signals comprising a continuous array of co-ordinate values extending within said geometric area;

a data store;

means for addressing said data store with said output signals of said subset processing means; and writing means for writing into said data store values derived from said first set of co-ordinate signals whereby at each co-ordinate address of the store defined by said output signals of the subset processing means there are stored corresponding values of input co-ordinates, said writing means including means for comparing said output signals of the subset processing with manually adjustable horizontal and vertical, high and low co-ordinate limits to produce an enable signal whereby said enable signal is false outside said limits, and means for suppressing said writing means when said enable signals is false.

17. A data processing device for enabling stored video images to be processed to reproduce image information from one image frame of a video signal so that it appears within another image frame of a video signal as if transposed onto a curved surface, the data processing device comprising:

means for generating a first set of co-ordinate signals the values of which represent the co-ordinate positions of image information within a store containing the picture information of said one image frame;

means for transforming the values of said first set of co-ordinate signals according to functions defining a desired curved surface in order to derive a second set of co-ordinate signals the values of which represent the co-ordinate positions within said other image frame at which the said curved surface will appear;

means for processing said second set of co-ordinate signals to derive therefrom a plurality of subsets of said signals each of which subsets includes a plurality of signals defining immediately adjacent co-ordinate positions at the corners of a given geometric area of a digital video image;

subset processing means for processing at least some of said subsets of signals to derive, for each said geometric area exceeding a given size, a plurality of further sets of co-ordinate signals corresponding to the co-ordinates of a plurality of smaller geometric areas of similar shape into which the first area can be subdivided, said smaller areas each lying within predetermined limits of size;

means for generating from said second set of co-ordinate signals and said further sets of co-ordinate signals output signals comprising a continuous array of co-ordinate values extending within said geometric area;

a data store;

means for addressing said data store with output signals of said subset processing means; and writing means for writing into said data store values derived from said first set of co-ordinate signals whereby at each co-ordinate address of the store defined by said output signals of the subset processing means there are stored corresponding values of input co-ordinates; said writing means comprising:

means for processing said subsets of signals defining immediately adjacent co-ordinate positions at the corners of a given geometric area to obtain a corresponding inverse determinant signal therefrom;

means for deriving from said subsets of signals, signals representing components of vectors defining the sides of said geometric area;

further means for processing said subsets of signals in conjunction with said output signals of said subset processing means to obtain component signals of a further vector having its ends defined by said output signals and said subsets of signals;

transformation means for obtaining in respect of said other image frame, component signals of said further vector, including multiplication means for multiplying said signals with said geometric area vector component signals and said inverse determinant signal; and addition means for adding said other image frame component signal to said first set of co-ordinate signals whereby the summed signals represent the values to be written to the said data store.

* * * * *